Aug. 19, 1969  G. E. RALEY  3,462,174

ROTATABLE COUPLING

Filed Feb. 28, 1967

United States Patent Office 3,462,174
Patented Aug. 19, 1969

3,462,174
ROTATABLE COUPLING
Garland E. Raley, Terre Haute, Ind., assignor to Ethyl Corporation, New York, N.Y., a corporation of Virginia
Filed Feb. 28, 1967, Ser. No. 619,414
Int. Cl. F16l 55/00
U.S. Cl. 285—14                     7 Claims

ABSTRACT OF THE DISCLOSURE

An apparatus for coupling a stationary conduit to a rotating conduit adapted to carry flowable material at high temperature and pressure. The apparatus is particularly suited for coupling a plastic extruder to a rotating extrusion die. The coupling includes a stationary base having an inner upstanding annular wall section which receives over it the lower section of a rotatable support assembly in a close rotating fit. Bearing means rotatably join the stationary base to the upper rotatable support assembly. The extremely close fit between the mating portions of the stationary base and rotatable support assembly permit the rotatable coupling to operate without utilizing gasketing or packing means in the passages exposed to the material flowing through the coupling. Those surfaces of the stationary and rotating portion of the coupling in close proximity are lubricated by permitting a small quantity of the material flowing through the joint to leak therefrom.

BACKGROUND OF THE INVENTION

Field of the invention

In general this invention relates to a coupling for connecting a rotatable conduit to a stationary conduit, in particular to one especially adapted for connecting a stationary plastic extrusion apparatus to an annular rotating die.

Description of the prior art

In U.S. Patent 3,020,588 there is disclosed a rotary plastic extrusion die utilized for the production of plastic film by the blown tube method. As pointed out in the foregoing patent plastic film manufactured by the blown tube method utilizing a fixed annular die is subject to irregularities in thicknesses across the width of the film caused by non-uniformity of spacing of the lips of the annular die. The patent teaches a solution to the problem by rotating the annular die in order to distribute the film thickness variations across the width of the film. By distributing the non-uniformity in thickness spirally around the blown tube the lay-flat characteristics and appearance of the finished film is substantially improved.

In the rotating joint or coupling disclosed in the foregoing patent tetrafluoroethylene packing is used to form a seal between the stationary and rotating portion of the die which are exposed to molten plastic material at high temperature and pressure. In commercial use the die of the foregoing invention would operate for reasonable long periods without replacing the packing. However, the joint had to periodically be disassembled in order to replace the packing. Additionally during the life of the packing it was necessary to frequently tighten the die holder against the packing to prevent excessive leakage of plastic material from the joint.

Thus it may be readily seen that there is a need for a rotatable coupling for attaching an annular die to a plastic extruder which does not require the use of seal rings or gasketing material that are exposed to molten plastic material at high temperature and pressure.

SUMMARY OF THE INVENTION

Therefore it is an object of the present invention to provide a rotatable coupling which will not require the use of packing or seal rings which are exposed to any material at high temperature and pressure.

It is a further object of the present invention to provide a rotatable coupling suitable for use at high temperature and pressure which utilizes the material flowing through the coupling to lubricate the portions of the coupling in close proximity.

The foregoing objects and other advantages of the invention are realized in a rotatable coupling having an axial opening therein which includes a stationary base portion cooperating with a rotatable support assembly. The stationary base includes a lower portion adapted to be coupled to another object and an upper portion having an annular recess provided in the top face thereof defining an outer wall section. The recess together with the axial opening through the base defines an annular inner wall section. The rotatable support assembly includes a center cylindrical portion providing a cylindrical recess in the bottom thereof which receives the annular inner wall section of the base. Bearing means joins, and supports in spaced apart relationship, the stationary base and the central cylindrical portion of the support assembly. A means is also provided to couple the support assembly to another object.

BRIEF DESCRIPTION OF THE DRAWINGS

The foregoing, and other objects, features and advantages of the present invention will be apparent from consideration of the following specification taken in conjunction with the accompanying drawings in which reference characters designate the same or similar parts throughout the several views.

In the drawings.

DESCRIPTION OF THE PREFERRED EMBODIMENTS

Figure 1:
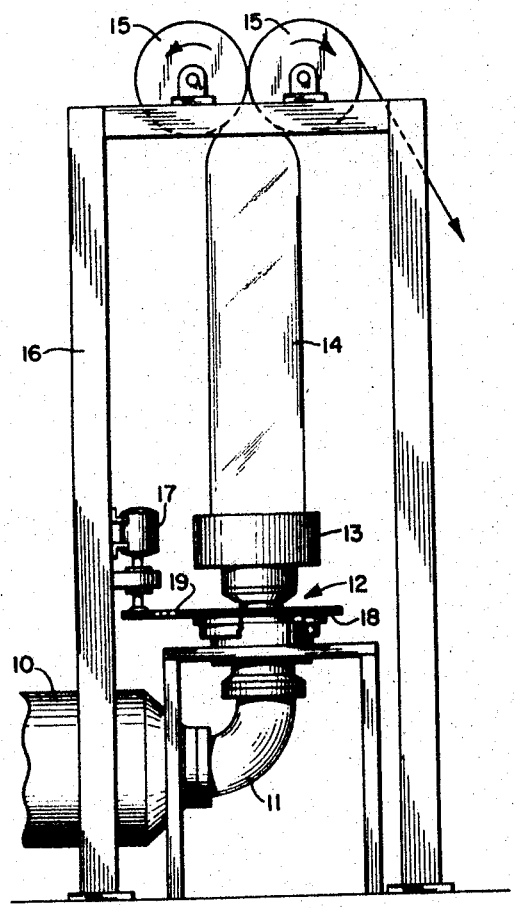
FIGURE 1 is an elevational view of a tubular plastic film extrusion assembly including the rotatable coupling of the present invention.

Referring now to FIGURE 1 the tubular film extrusion apparatus includes an extruder 10 which feeds a molten thermoplastic material through elbow 11 to the rotatable coupling, designated generally by the numeral 12, which has an annular die 13 attached to its upper end. The thermoplastic material is extruded from the die in the form of a thin wall tube 14 which is inflated by air supplied through an opening (not shown) in the face of the die. A pair of nip rolls 15—15 supported by frame 16 are positioned some distance above the die 13. The rolls trap the air within the tube 14 and also flatten the tube as it passes therethrough. The flattened tube is then slit to form film which passes to take-up reels (not shown). The annular die 13 is rotated by means of a motor 17 which drives the die through sprocket 18 by means of chain 19. As explained hereinbefore the rotation of the die distributes the non-uniform thickness in a helically pattern around the circumference of the thin wall tube 14. If desired the die may be oscillated through 180 degrees rather than rotating through 360 degrees.

Figure 2:
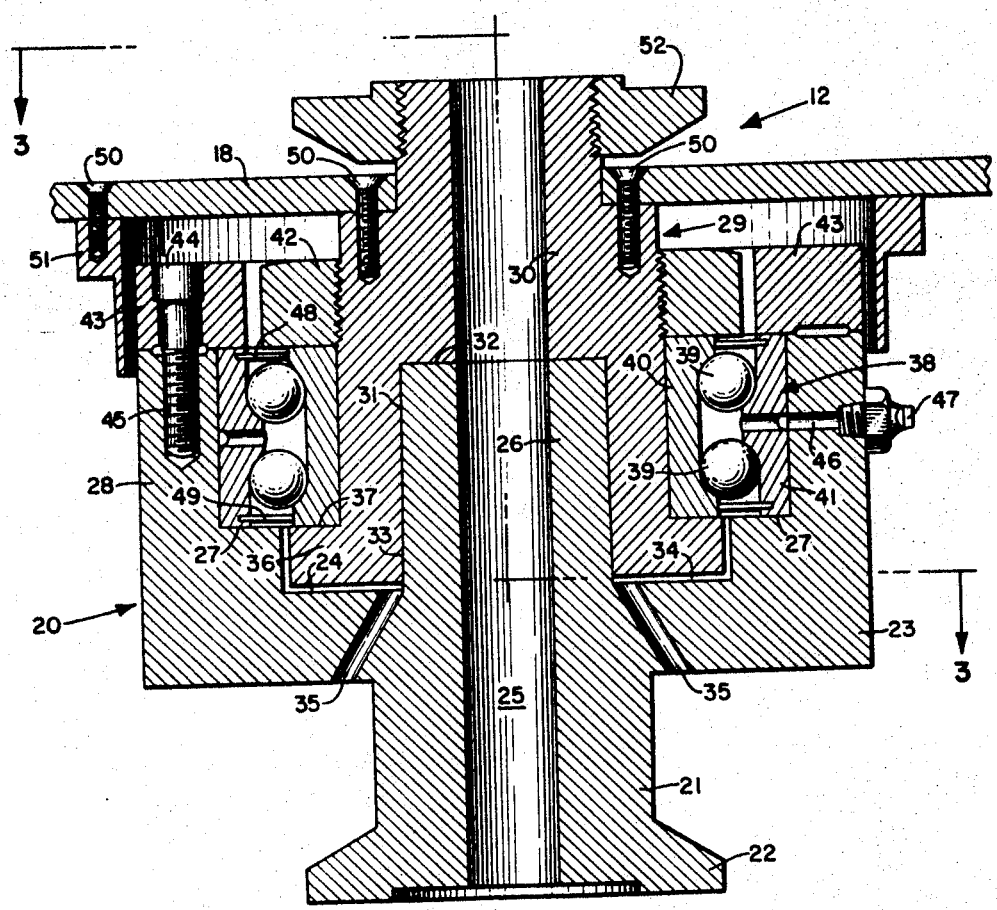
FIGURE 2 is an elevational axial, cross sectional view of one embodiment of the rotatable coupling of the present invention.

Referring now to FIGURE 2 the portable coupling illustrated includes a stationary base portion, designated generally by the numeral 20. The base has a lower portion 21 which is adapted to be coupled to a stationary conduit, such as the elbow 11 of the extruder 10, by means of a bottom flange 22. The upper portion 23 of the base is provided with an annular recess 24 in the top face thereof. The annular recess 24, together with the axial opening 25 in the base 20, defines an annular, upwardly extending inner wall section 26 of the base 20. The annular recess 24 provides an annular shoulder 27 extending radially inwardly from outer wall section 28.

The rotatable support assembly, designated generally by the numeral 29, is removably mounted on the stationary base 20. The support assembly includes a central cylindrical portion 30 having a coaxial opening therein which is coextensive with the opening 25 in the base. A cylindrical coaxial recess 31 is provided in the bottom surface of central portion 30. The recess 31 provides an annular shoulder 32 on the interior of central portion 30 and defines cylindrical sidewall 33 which has a close sliding fit with the upstanding cylindrical inner wall section 26. The coaxial recess 31 has a depth which is slightly shorter than the height of upstanding cylindrical inner wall section 26 in order to provide an annular open space 34 between the bottom of center cylindrical portion 30 and the upper face of the base 20 at the bottom of recess 24. A plurality of openings 35 are provided in the bottom of the upper portion of the base whereby the annular open space 34 is open to the atmosphere.

A radially extending ring 36 is provided on the bottom of central cylindrical portion 30 which provides a shoulder 37 oppositely opposed to annular shoulder 27. The bearing assembly, designated generally by the numeral 38, is seated on shoulders 27 and 37 and occupies a portion of the annular recess 24. Separate sets of vertically spaced ball bearings 39—39 are contained between inner race 40 and outer race 41. Bearing assembly 38 is removably attached to the rotatable support assembly 29 by means of inner retaining nut 42 which is threadably attached to central cylindrical portion 30. The retaining nut 42 presses the inner race 40 of the bearing assembly firmly against the shoulder 37. The outer race 41 of the bearing assembly is seated on shoulder 27 and held there by means of outer retaining ring 43. Ring 43 abuts the top surface of both race 41 and outer wall section 28 and is held firmly against both surfaces by means of cap screws 44 received in threaded openings 45 provided in the wall 28.

An aligned opening 46 is provided in sidewall 28 and outer race 41 of the bearing assembly to permit the introduction of grease to the bearing assembly. The high pressure grease fitting 47 is threadably attached to sidewall 28 at the opening 46. An upper grease seal ring 48 and a lower grease seal ring 49 extend between the inner and outer bearing races to prevent grease from entering the channel between the spaced apart outer retaining ring 43 and the nut 42, and also from entering the annular space 24.

Figure 3:
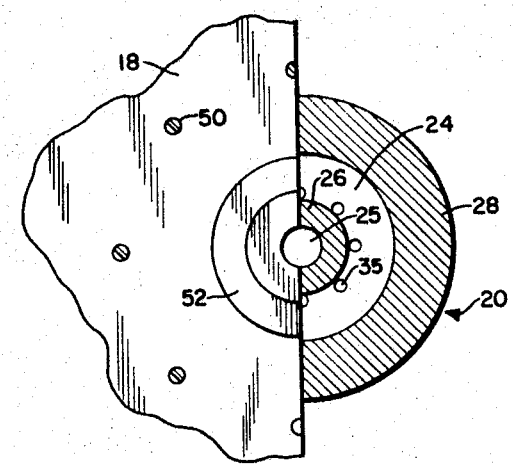
FIGURE 3 is a plan view, partially in section, of FIGURE 2 along the line 3—3.

As seen in FIGURES 2 and 3 sprocket 18 is attached to the upper portion of the rotatable support assembly 29 by means of screws 50. An annular dust ring 51 is attached to the underside of sprocket 18 by means of screws 50. The dust ring is spaced slightly away from the outer surface of outer wall section 28 and prevents dust and other contaminants from entering the coupling. A top flange 52 is threadedly attached to the upper end of the central cylindrical 30 of the rotatable support assembly 29. The top flange permits the rotating part of the coupling to be attached to a rotating object. In the present illustration, this is the rotating annular die 13.

In constructing the die of the present invention it is extremely important that the outside diameter and surface finish of the upstanding cylindrical wall section 26 be held to extremely close tolerance. Additionally the inside diameter of the coaxial recess 31 provided in the cylindrical portion 30 of the rotating support assembly is to be held to extremely close tolerance and is to be finished with a very smooth surface in order that the adjacent surfaces be separated by only a very small dimension in this critical area. It has been found that for best results the spacing between the outer wall surface of upstanding cylindrical wall section 26 and the inner wall surface provided by recess 33 should be between about 0.001 inch to about 0.005 inch. Spacings exceeding 0.005 inch may be used however excessive leakage of the plastic flowing material through the openings 35 may occur. It is preferred to have the spacing between the shoulder 32 provided by the recess 31 and the top of the upstanding cylindrical section 26 to be from about 0.002 inch to about 0.004 inch. It is preferred that the space separating the sidewall of upstanding cylindrical recess 31 should be from about 0.001 inch to about 0.003 inch. When spacings within the foregoing ranges are used the rotating joint of the present invention has been found to permit a controlled leakage of about one half ounce of molten polyethylene per hour when the joint is used in the manufacture of polyethylene film made from low density polyethylene. In the construction of the die of the present invention it is essential that precision machining be utilized to form the fit between the upstanding cylindrical section 26 and the wall 33 of the recess 31 since no adjustment can be obtained to compensate for errors in these dimensions. However, by proper use of shims on various surfaces such as the shoulders 27, 37 and underneath outer ring 43, it is possible to make an adjustment of the position of rotatable support assembly 29 to control the spacing between the annular shoulder 32 and the top of upstanding cylindrical section 26.

The rotating joint of the present invention may be constructed from any material sufficiently strong to withstand the high temperature and pressure to which it will be exposed to in service to which the joint is intended. Preferred materials are tool steel, stainless steel, and other alloy steels which possess the required strength and corrosion resistance for the intended service. Commercially available steel has been found satisfactory for manufacture of the rotating joint of the present invention when the joint is to be utilized in the manufacture of polyethylene, polypropylene films. The joint of the present invention has been utilized in the manufacture of polyvinyl chloride films by the incorporation of stainless steel liner for the flow passage 25 to protect the steel from contact with molten polyvinyl chloride which is corrosive to mild steel. The rotating joint of the present invention may be manufactured in any number of sizes suitable for conventional plastic extruders up to eight inch screw diameter. Successful models of the rotating joint of the present invention have been constructed and utilized in manufacturing polyethylene film wherein the extruder pressure has reached at least 5,000 p.s.i.g. and wherein the plastic melt has had a temperature of at least 400° F. when flowing through the rotating joint to the annular die. By utilization bearings of the angular contact type the die is able to withstand either radial or vertical loading of the bearing assembly. It is apparent that an unbalanced radial load is applied to a rotating coupling assembly by the tension of the drive chain on the sprocket. Additionally it is evident that a high downward thrust load is placed on the bearings by virtue of the weight of the annular die used on top of the rotating joint. It is not uncommon for annular dies up to as high as 1,500 pounds net weight be utilized with a rotating joint of the present invention. Additionally it is seen that the rotating joint is exposed to upward thrust forces by virtue of the high back pressure exerted on the extruder by the die, i.e., as high as 5,000 p.s.i.g. The rotating joint of the present invention, while not limited thereto, has special advantageous features making it extremely useful in coupling a rotating annular die to a plastic extruder for the manufacture of film by the blown tube method. The joint is suitable for use with plastic cellulose material and synthetic plastics such as polyethylene, polypropylene, nylon, polystyrene, polyvinyl chloride, copolymers of various materials such as vinyl chloride and vinylidene chloride and many other polymers which are capable of being extruded through a die. However, the invention is not limited to the use in a plastic extruder but may be used for other services such as the loading of asphalt through a rotating joint or the feeding of highly viscous material such as a paraffin wax to centrifuges or other devices wherein a rotating joint is desired.

While there has been described what is at present a preferred embodiment of the present invention, it will be apparent to those skilled in the art that various modifications and changes may be made without departing from the essence of the present invention.

What is claimed is:

1. A rotatable coupling having an axial opening therein for conveying viscous material at high temperature and pressure comprising:
   (a) a one piece stationary base including,
      (i) a lower portion adapted to be coupled to another object,
      (ii) an upper portion having an annular recess provided in the top face thereof defining an outer wall section and, together with said axial opening, an annular inner wall section, said outer wall section and inner wall section being integrally formed;
      (iii) a plurality of openings being provided in said outer wall section having their inner ends terminating adjacent the base of said inner wall section;
   (b) a rotatable support assembly including.
      (i) a central cylindrical portion providing a coaxial cylindrical recess in the bottom thereof receiving said annular inner wall section of said base, the inner walls of said central cylindrical portion provided by said recess and the facing walls of said inner wall section being very closely spaced and free from any fluid sealing means whereby a small quantity of said viscous fluid flowing through said axial opening will flow between the closely spaced walls to lubricate the walls and purge the space therebetween and exit from said coupling through said plurality of openings in said outer wall section, said cylindrical portion being provided with a radially extending ring on the bottom portion thereof which substantially occupies the space between the outer wall section and the inner wall section;
      (ii) bearing means joining, and supporting in spaced apart relationship, said stationary base and said central cylindrical portion of said support assembly, said bearing means received in an annular space provided between said stationary base and said central cylindrical portion of said support assembly, said bearing means including at least one seal ring at the lower end thereof to prevent said viscous material from contacting the inner portions of said bearing assembly, and
      (iii) means to couple said support assembly to another object.

2. The coupling defined in claim 1 wherein said bearing means is a removable roller bearing assembly.

3. The coupling defined in claim 2 wherein said bearing assembly is seated on oppositely disposed shoulders provided on the outer wall of said central cylindrical portion of said support assembly and on the annular interior wall of said outer wall section of said upper portion of said base.

4. The coupling defined in claim 1 wherein said annular inner wall section of said base and said central cylindrical portion of said support assembly are separated from each other by a spacing of from about 0.001 inch to about 0.005 inch.

5. The coupling defined in claim 1 including means for engaging said rotatable support assembly with a source or rotational power.

6. The coupling of claim 1 wherein said walls of both said central cylindrical portion provided by said recess and said facing walls of said inner wall section include longitudinally extending cylindrical side walls terminating in transversely extending annular end walls.

7. The coupling of claim 1 wherein said quantity of viscous fluid flowing between said facing walls is about one-half ounce per hour when said viscous material is low density polyethylene.

References Cited

UNITED STATES PATENTS

| 1,151,334 | 8/1915  | Bell     | 285—275   |
| 1,324,967 | 12/1919 | Hoting   | 285—134   |
| 1,703,823 | 2/1929  | Johansen | 285—14    |
| 1,883,509 | 10/1932 | Boone    | 285—280 X |
| 2,144,117 | 1/1939  | Miller   | 285—275   |
| 2,388,798 | 11/1945 | Parker   | 285—276 X |
| 2,429,929 | 10/1947 | Fisher   | 285—276 X |
| 2,717,166 | 9/1955  | Hedden   | 285—276 X |
| 2,906,548 | 9/1959  | Faccou   | 285—14    |
| 3,129,960 | 4/1964  | Schrodt  | 285—14 X  |

THOMAS F. CALLAGHAN, Primary Examiner

U.S. Cl. X.R.

285—94, 276

PO-1050
(5/69)

UNITED STATES PATENT OFFICE
CERTIFICATE OF CORRECTION

Patent No. 3,462,174      Dated August 19, 1969

Inventor(s) Garland E. Raley

It is certified that error appears in the above-identified patent and that said Letters Patent are hereby corrected as shown below:

Column 1, line 58, reads "rotating portion", should read -- rotating portions -- . Column 1, line 61, reads "reasonable long", should read -- reasonably long -- . Column 2, line 69, reads "portable coupling", should read -- rotatable coupling -- . Column 3, line 62, reads "is threadedly", should read -- is threadably -- . Column 3, line 63, reads "cylindrical 30", should read -- cylindrical portion 30 -- . Column 4, line 12, reads "cylindrical recess 31", should read -- cylindrical wall section 26 and the sidewall 33 of cylindrical recess 31 -- . Column 4, line 41, reads "of stainless", should read -- of a stainless -- . Column 6, line 24, delete the word "both".

SIGNED AND
SEALED
MAY 12 1970

(SEAL)
Attest:

Edward M. Fletcher, Jr.
Attesting Officer

WILLIAM E. SCHUYLER, JR.
Commissioner of Patents